US008253855B2

(12) United States Patent
Ogilvie

(10) Patent No.: US 8,253,855 B2
(45) Date of Patent: Aug. 28, 2012

(54) AUTOMATIC LUMINANCE-CHROMINANCE DELAY COMPENSATION

(75) Inventor: Daniel B. Ogilvie, Kitchener (CA)

(73) Assignee: LSI Corporation, Milpitas, CA (US)

( * ) Notice: Subject to any disclaimer, the term of this patent is extended or adjusted under 35 U.S.C. 154(b) by 1198 days.

(21) Appl. No.: 12/050,298

(22) Filed: Mar. 18, 2008

(65) Prior Publication Data

US 2009/0033798 A1    Feb. 5, 2009

Related U.S. Application Data

(60) Provisional application No. 60/963,286, filed on Aug. 2, 2007.

(51) Int. Cl.
*H04N 5/21* (2006.01)

(52) U.S. Cl. ......... 348/519; 348/663; 348/631; 348/518

(58) Field of Classification Search .................. None
See application file for complete search history.

(56) References Cited

U.S. PATENT DOCUMENTS 4,263,612 A * 4/1981 Gibson et al. ............... 348/665

FOREIGN PATENT DOCUMENTS

JP          60119190 A  *  6/1985

OTHER PUBLICATIONS

Muramoto, Processing circuit of video signal, Jun. 26, 1985, JPO, (englist translated abstract).*

* cited by examiner

*Primary Examiner* — Vivek Srivastava
*Assistant Examiner* — Rong Le
(74) *Attorney, Agent, or Firm* — Christopher P. Maiorana, PC

(57) ABSTRACT

A method of automatic luminance-chrominance delay compensation is disclosed. The method generally includes the steps of (A) generating an intermediate signal by processing a video signal such as to enhance a plurality of edges in a picture within the video signal, the picture having a luminance component and a chrominance component temporally separated from each other by an actual delay, (B) identifying an estimated delay between the luminance component and the chrominance component by correlating the luminance component in the intermediate signal to the chrominance component in the intermediate signal at a plurality of relative delays and (C) compensating for the actual delay by delaying one of either (i) the luminance component and (ii) the chrominance component by the estimated delay.

17 Claims, 5 Drawing Sheets

US 8,253,855 B2

AUTOMATIC LUMINANCE-CHROMINANCE DELAY COMPENSATION

This application claims the benefit of U.S. Provisional Application No. 60/963,286, filed Aug. 2, 2007 and is hereby incorporated by reference in its entirety.

FIELD OF THE INVENTION

The present invention relates to video processing generally and, more particularly, to a method and/or apparatus for an automatic luminance-chrominance delay compensation.

BACKGROUND OF THE INVENTION

Conventional video sources, for example video cassette recorders (VCRs), commonly have luminance (Y) components mistimed with chrominance (C) components. The resulting non-coincidence of vertical edges in the video images leads to an overall lack of clarity and the vertical edges are smeared. A number of conventional video decoders offer a YC delay control that allows the user to vary the comparative delay. However, a problem with the manual control method is that the user needs to know the delay to be able to compensate for the delay, rendering the control ineffective. The manual adjustments are very difficult to do 'by eye', especially for an unskilled user. The manual adjustments are also best performed with specific video test patterns not readily available to the common user. Furthermore, the delay can vary in time, especially for mechanical mechanisms such as VCRs.

SUMMARY OF THE INVENTION

The present invention concerns a method of automatic luminance-chrominance delay compensation. The method generally includes the steps of (A) generating an intermediate signal by processing a video signal such as to enhance a plurality of edges in a picture within the video signal, the picture having a luminance component and a chrominance component temporally separated from each other by an actual delay, (B) identifying an estimated delay between the luminance component and the chrominance component by correlating the luminance component in the intermediate signal to the chrominance component in the intermediate signal at a plurality of relative delays and (C) compensating for the actual delay by delaying one of either (i) the luminance component and (ii) the chrominance component by the estimated delay.

The objects, features and advantages of the present invention include providing a method and/or apparatus for an automatic luminance-chrominance delay compensation that may (i) adjust a relative delay between the luminance and the chrominance over a wide range, (ii) change the adjustment in real time, (iii) operate without user intervention, (iv) detect a sub-pixel offset delay, (v) operate independently of picture content and/or (vi) process spatially static pictures.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The present invention generally provides a technique to automatically compensate for a delay between luminance components and color components of a video signal. The technique may be largely independent of both picture (e.g., fields and/or frames) content and picture source where a sufficient number of edges are available to measure. In case of spatially static (e.g., flat luminance) pictures, the technique generally detects the absence of edges and defaults to a set configuration. The technique may be applicable for any component video material and may be applied within an input video processor and/or an output video processor.

Figure 1:
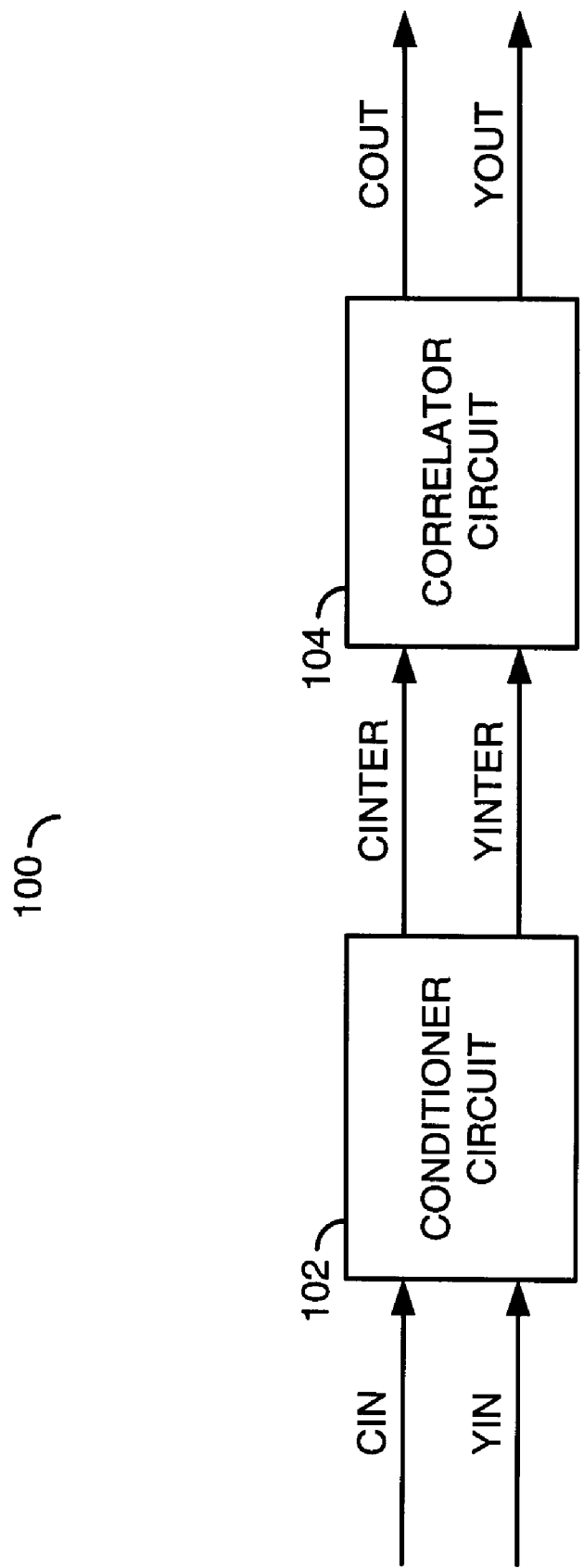
FIG. 1 is a block diagram of an apparatus in accordance with a preferred embodiment of the present invention.

Referring to FIG. 1, a block diagram of an apparatus 100 is shown in accordance with a preferred embodiment of the present invention. The apparatus (or system) 100 generally comprises a circuit (or module) 102 and a circuit (or module) 104. A color input signal (e.g., CIN) may be received by the circuit 102. A luminance (luma) input signal (e.g., YIN) may also be received by the circuit 102. The circuit 102 may generate and present a color intermediate signal (e.g., CINTER) and a luma intermediate signal (e.g., YINTER) to the circuit 104. A color output signal (e.g., COUT) may be generated and presented by the circuit 104. The circuit 104 may also generate and present a luma output signal (e.g., YOUT).

The signal CIN and the signal YIN combined generally form a video signal comprising a sequence of pictures. The signal CIN may carry the chrominance components of the pictures and the signal YIN may carry the luminance component of the pictures. The chrominance components and the luminance components may be temporally offset from each other by an actual delay value. The apparatus 100 is generally operational to correct for the actual delay such that the chrominance components in the signal COUT and the luminance components in the signal YOUT are aligned with each other in time.

The circuit 102 may implement a conditioning circuit. The circuit 102 is generally operational to precondition the pictures received in the signals CIN and YIN to create the signals CINTER and YINTER. The preconditioning may include, but is not limited to, filtering and edge enhancements. Each of the chrominance data components (e.g., a U component and a V component) and the luminance data component (e.g., Y) may be preconditioned by a bandpass filter to reduce noise and to remove the DC components of the signals. A first order differential may then be taken of both signals to improve a probability that the circuit 104 finds edges within the pictures.

The circuit 104 may implement a correlator circuit. The circuit 104 is generally operational to correlate the edges within the chrominance component of each picture to the edges within the luminance component. The correlations may be performed at each of several delays of the luminance data relative to the chrominance data. Once a best correlation is found, the corresponding chrominance data and luminance data may be presented in the signals COUT and YOUT respectively. As such, the signals COUT and YOUT may convey phase-corrected pictures.

Figure 2:
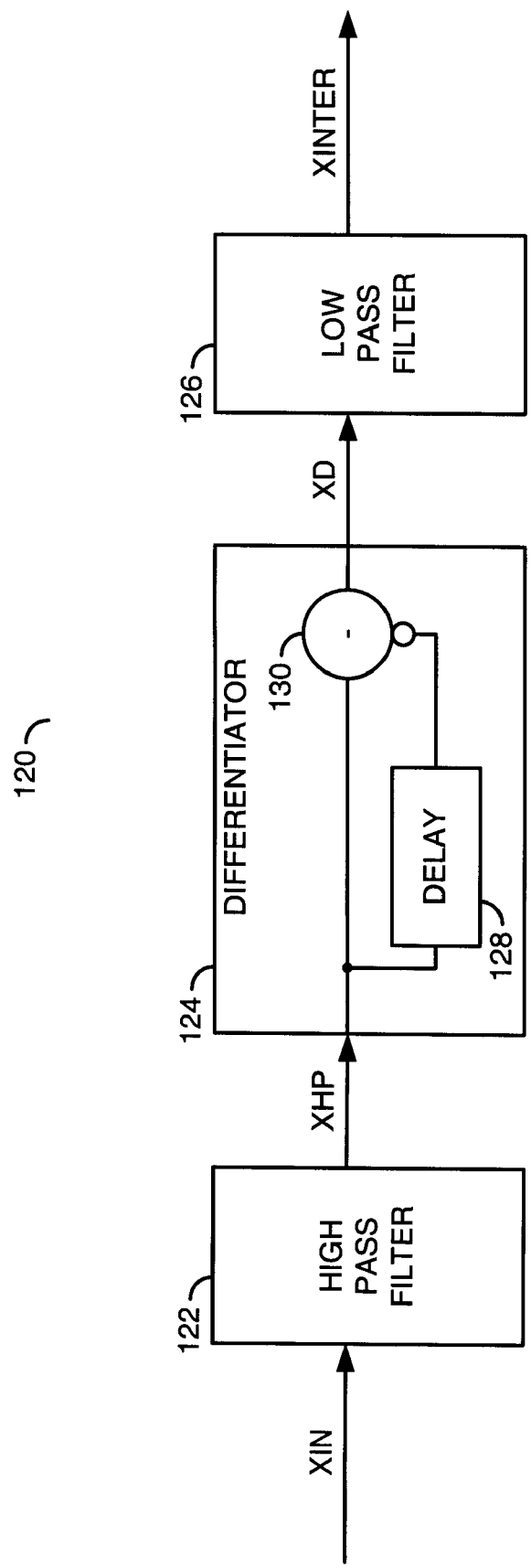
FIG. 2 is a block diagram illustrating a channel in an example implementation of a conditioner circuit.

Referring to FIG. 2, a block diagram illustrating a channel 120 in an example implementation of the circuit 102 is shown. The channel 120 may be repeated multiple times in the circuit 102, a single instantiation for each of the chrominance component and the luminance component. The signal XIN may represent the signal CIN for a chrominance channel and the signal YIN for a luminance channel. Likewise, the signal XINTER may represent the signal CINTER for the chrominance channel and the signal YINTER for the luminance channel. Each channel 120 is generally operational to bandpass filter and enhance the pictures received in the signal XIN to create edge-enhanced pictures in the signal XINTER.

The channel 120 generally comprises a circuit (or module) 122, a circuit (or module) 124 and a circuit (or module) 126. The circuit 122 may receive the signal XIN. A signal (e.g., XHP) may be generated by the circuit 122 and presented to the circuit 124. A signal (e.g., XD) may be generated by the circuit 124 and presented to the circuit 126. The circuit 126 may present the signal XINTER.

The circuit 122 may implement a high pass filter. The circuit 122 may be operational to high pass filter the signal XIN to create the high-pass signal XHP. In one embodiment, the circuit 122 may be designed as a low pass filter and a subtractor. In operation, the full signal spectrum may be feed into both the low pass filter and the subtractor. The low frequency components passed through the low pass filter may then be subtracted from the full frequency signal by the subtractor leaving only the high frequency components. Other filter designs may be implemented to meet the criteria of a particular application. The resulting high-pass filtering operation generally enhances edge details in the pictures and provides DC component removal.

The circuit 124 may implement a first order differentiator. The circuit 124 is generally operational to enhance edges within the pictures. The circuit 124 generally comprises a delay 128 (e.g., 37 nanosecond (ns)) and a subtractor 130. Enhancements may be achieved by differentiating (130) each sample in the pictures with an earlier sample held by the delay 128. The differentiated pictures may be presented in the differentiation signal XD to the circuit 126.

The circuit 126 may implement a low pass filter. The circuit 126 is generally operational to low pass filter the differentiated pictures to remove high-frequency noise that may otherwise be enhanced by the circuits 122 and 124. A frequency response of the low-pass filter may overlap that of the high-pass filter to create a band-pass filter. The circuit 126 and/or the circuit 124 may also be operational to remove a polarity of the detected edges to create absolute values in the signal XINTER.

Figure 3:
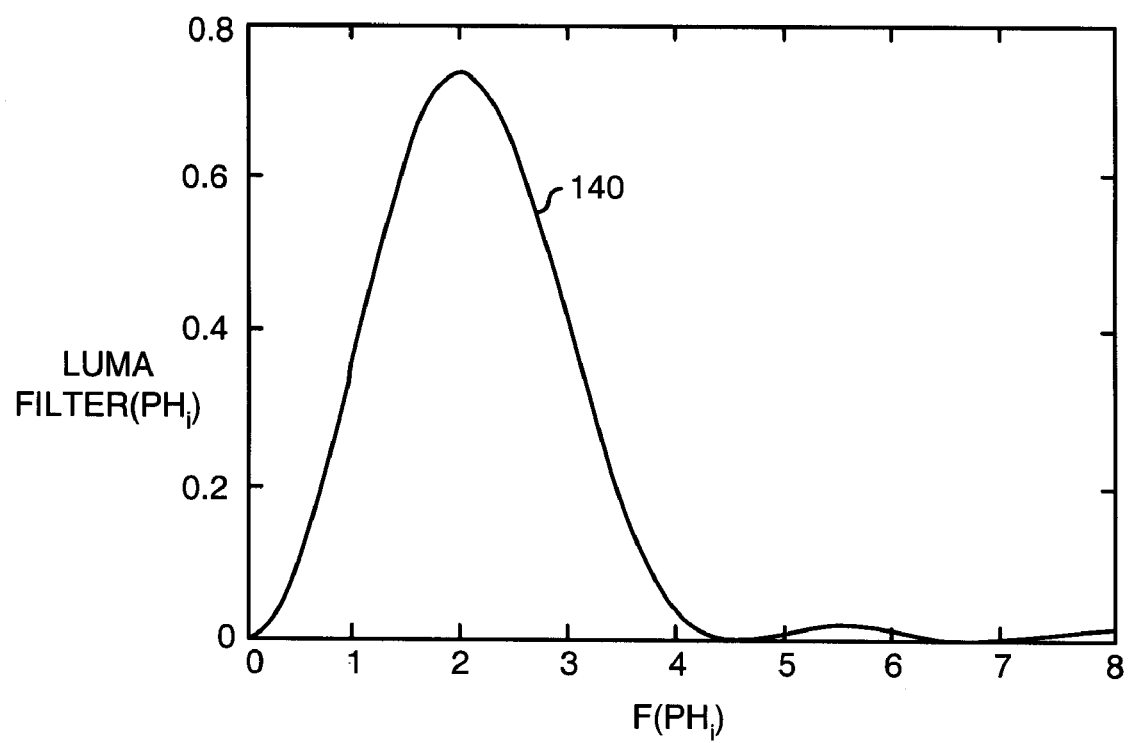
FIG. 3 is a plot of an example frequency response of a luminance channel conditioner circuit.

Referring to FIG. 3, a plot of an example frequency response 140 of a luminance channel circuit 120 is shown. The response 140 may be illustrative of a luminance channel filter. The filter, (e.g., FILTER(PH)) generally comprises (i) three cascaded ¼ ½ ¼ elements with spacing of six for the circuit 122 and (ii) two low pass elements with spacings of 2 T and 1 T, where T=1/27 megahertz, for the circuit 126. The filter may be described by design equations 1-9 as follows:

$$N := 1000 \qquad \text{Eq. (1)}$$

$$Fs := 27.0 \qquad \text{Eq. (2)}$$

$$i := 0, \ldots, N-1 \qquad \text{Eq. (3)}$$

$$PHi := 2\pi i/N \qquad \text{Eq. (4)}$$

$$F(PH) := PH \times Fs/2\pi \qquad \text{Eq. (5)}$$

$$F2PH(F) := 2\pi F/Fs \qquad \text{Eq. (6)}$$

$$TdB(X) := 20 \log(X) \qquad \text{Eq. (7)}$$

$$LPF(PH,N) := (1 + \cos(N \times PH))/2 \qquad \text{Eq. (8)}$$

$$FILTER(PH) := ((1 - LPF(PH,6)) \times LPF(PH,2) \times LPF(PH,1)) \qquad \text{Eq. (9)}$$

The filter may be used for both the chrominance component and the luminance components. To increase the amplitude of the chroma edges, a lower pass filter may be implemented with the response as shown in FIG. 4.

Figure 4:
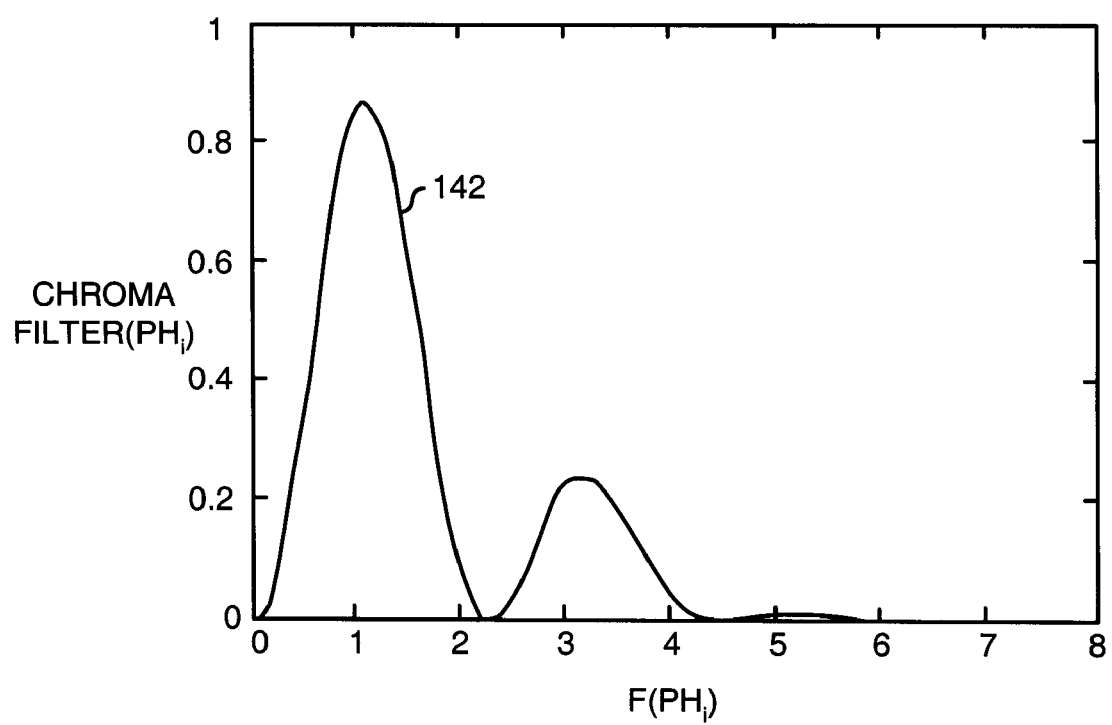
FIG. 4 is a plot of an example frequency response of a chrominance channel conditioner circuit.

Referring to FIG. 4, a plot of an example frequency response 142 of a chrominance channel circuit 120 is shown. The response 142 may be illustrative of a chrominance channel filter. A difference between the luma response 140 and the chroma response 142 may be that a spacing of the luma response 140 is increased to 12 T. If different filters are implemented, compensation should be provided for the different phase delays through the two filters.

Figure 5:
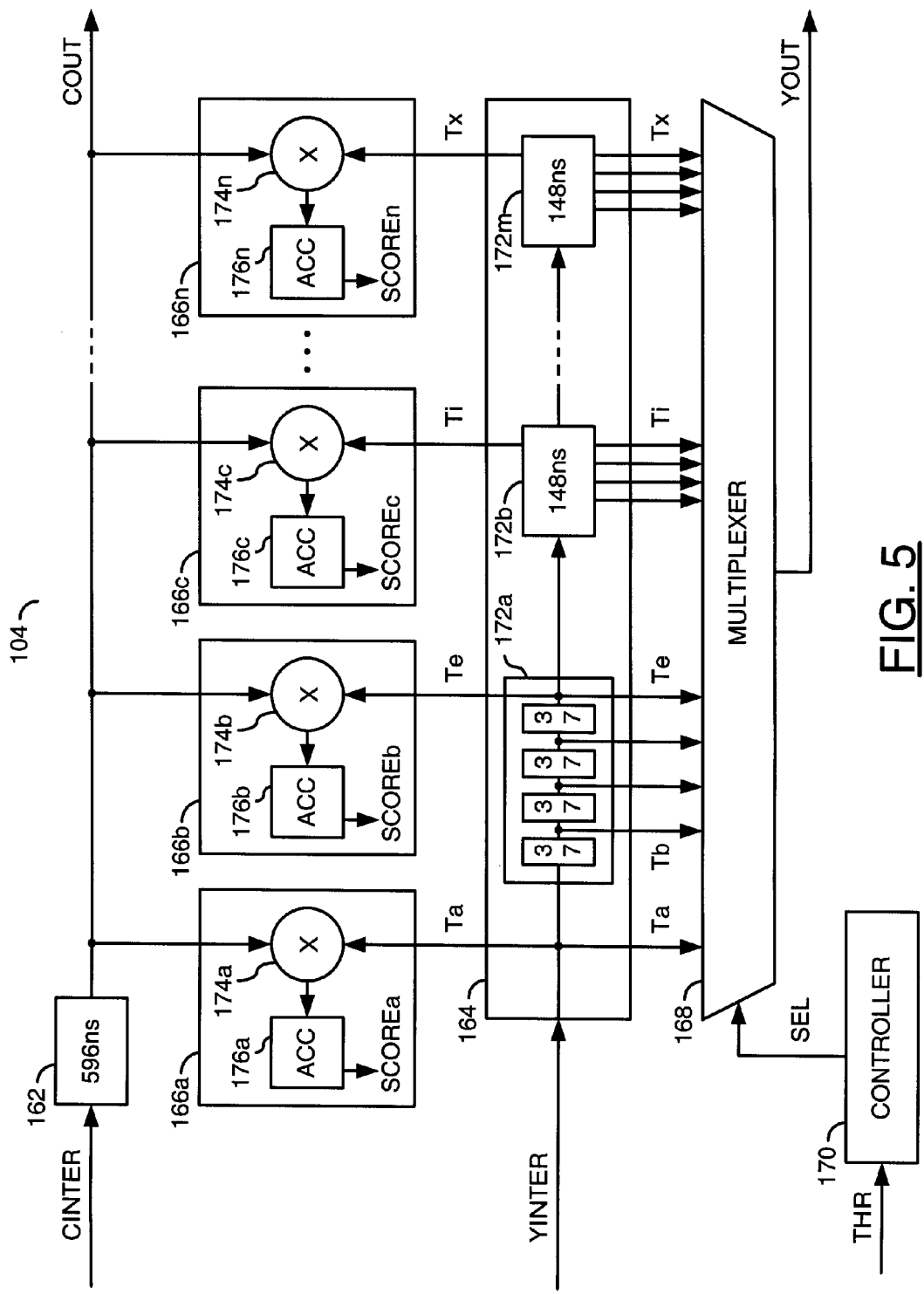
FIG. 5 is a block diagram of an example implementation of a correlator circuit.

Referring to FIG. 5, a block diagram of an example implementation of the circuit 104 is shown. The circuit 104 generally comprises a circuit (or module) 162, a circuit (or module) 164, multiple circuits (or modules) 166a-n, a multiplexer 168 and a circuit (or module) 170. The signal CINTER may be received by the circuit 162. The circuit 162 may create the signal COUT. The signal YINTER may be received by the circuits 164. Multiple tap signals (e.g., Ta-Tx) may be presented from the circuit 164 to the multiplexer 168. Some of the tap signals (e.g., Ta, Te, Ti, ..., Tx) may also be presented to the circuits 166a-166n. A select signal (e.g., SEL) may be generated by the circuit 170 to control the multiplexer 168. The signal YOUT may be created at an output port of the multiplexer 168. Another signal (e.g., THR) may convey a threshold value to the circuit 170.

In the embodiment illustrated in FIG. 5, the chrominance component may be delayed by a fixed amount of time (e.g., 596 ns) that is approximately half of an overall adjustment range (e.g., ±596 ns). The luminance component may be delayed in multiple steps (e.g., −596 ns, −444 ns, −296 ns, −148 ns, 0 ns, +148 ns, +296 ns, +444 ns, +596 ns) relative to the fixed amount of time. In other embodiments, the luminance component may be delayed by the fixed amount and the chrominance component delayed in the multiple steps. Other adjustment ranges and/or other fixed delays may be implemented to meet the criteria of a particular application.

The circuit 162 may implement a delay circuit. The circuit 162 is generally operational to delay the signal CINTER for the fixed amount of time to generate the signal COUT. The signal COUT may be presented to each of the circuits 166a-166n. In applications where the chrominance components have a data rate of 27 Mhz, the circuit 162 may be implemented as a sequence of 16 delay registers each having a delay of 1/27 MHz (e.g., 37 ns).

The circuit 164 may implement a delay line. The circuit 164 may be operational to delay the signal YINTER in multiple steps over a total delay time (e.g., 1192 ns) to create the signals Ta-Tx. The circuit 164 may have several (e.g., 8) major taps and multiple (e.g., 32) minor taps. Each one of the minor taps may present a signal (e.g., Ta-Tx) to a respective input port of the multiplexer 168. The major taps may present the signals Ta, Te, Ti, ..., Tx to the respective circuits 166a-166n.

Each of the circuits 166a-166n may implement a correlation finger. The circuits 166a-166n are generally operational to calculate a correlation score (e.g., SCOREa-SCOREn) by measuring a phase error between chrominance data in the signal COUT with the luminance data received from the major taps of the circuit 164. The correlation scores may be presented to the circuit 170.

The circuit 170 may implement a controller circuit. The circuit 170 is generally operational to control the functionality of the circuit 104. In particular, the circuit 170 may receive the correlation scores from all of the circuit 166a-166n and determine (i) if at least one of the correlation scores meets or exceeds the threshold value in the signal THR, (ii) if several exceed the threshold, calculate an estimated value of the actual delay and (iii) control the multiplexer 168 through the signal SEL to transfer the delayed signal YINTER from the appropriate major/minor tap to the signal YOUT.

The circuit 164 generally comprises multiple circuits (or modules) 172a-172m. Each of the circuits 172a-172m may be implement a particular delay (e.g., 148 ns). The major taps may be taken from before the first circuit 172a, from between each of the circuits 172a-172m, and from after the circuit 172m. The minor taps may be taken at each of the major taps and from ports internal to the circuits 172a-172m.

Each of the circuits 172a-172m generally comprises several (e.g., 4) of the 37 ns delay registers. The minor taps may be taken from an output port of each of the delay registers. The output ports of every fourth delay register may also be used for the major taps.

A mid-tap position in the circuit 164 may be a nominal default delay. The length of the delay about the mid-tap position is generally the amount of compensation that may be applied. A compensation of ±596 ns is usual for VCR applications, although the delay may be non-symmetrical about the mid-tap position. Furthermore, the delays may be temporally non-linear. For example, the major taps closer to the center of the circuit 164 may be temporally closer to each other than the major taps near the beginning and near the end of the delay line.

At every major tap (e.g., every 148 ns offset), a correlation may be performed between the edges of the chrominance data and the edges of the luminance data. Multipliers 174a-174n (or a single multiplier multiplexed at high speed) may be used to multiply the chrominance data with the luminance data. A magnitude calculated by each of the multipliers 174a-174n is generally indicative of the coincidence of the chroma edges and the luma edges under consideration. The higher the magnitude, the higher the coincidence of the two edges.

Multiple accumulators 176a-176n may be used to integrate the multiplication magnitudes over an area of the currently active picture. The multiplication values are generally accumulated during a central portion of the active picture area. The accumulators 176a-176n may be reset at a beginning of each active picture. The accumulated values may then be passed to holding registers at the end of the active picture region. The above process may be repeated in each of the circuits 166a-166n to create and update the correlation scores at every picture interval.

The circuit 170 may determine the estimated delay between the signal CINTER and the signal YINTER using one or more approaches. In a first approach, the circuit 170 may identify a particular correlation score having a highest value among all of the correlation scores. Once identified, the signal SEL may be generated commanding the multiplexer 168 to route the major tap associated with the highest correlation score to the signal YOUT.

In a second approach, two or more correlation scores may be considered by the circuit 170. The circuit 170 may perform a best fit process to the correlation scores. A maxima position of the resulting curve generally determines a calculated highest correlation score. A particular tap among the major/minor taps temporally closest to the calculated highest correlation score may be selected to route the delayed signal YINTER to the signal YOUT. The second approach may allow a sub-pixel estimated delay to be calculated using less hardware than if the circuits 166a-166n measured all of the minor taps.

Two conditions should be detected by the circuit 170 to ensure reliable operation. Firstly, the default position (e.g., a default luma delay and the fixed chroma delay) may be selected by the circuit 170 if the source material is changing or under conditions in which the source material is unstable. For example, the source material may be considered unstable prior to reliable synchronization or during tuning. Secondly, the default position may be selected if an insufficient number of edges are measurement to reliably estimate the actual delay. Such conditions may occur during monochromatic pictures or spatially static pictures. The conditions may be detected by thresholding the correlation scores provided from the accumulators 176a-176n. If all of the correlation scores are too low, the default position may be applied and a current delay selection may be maintained.

The functions performed by the diagrams of FIGS. 1-5 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the scope of the invention.

The invention claimed is:

1. A method of automatic luminance-chrominance delay compensation, comprising the steps of:
   (A) generating an intermediate signal by processing a video signal such as to enhance a plurality of edges in a picture within said video signal, said picture having a luminance component and a chrominance component temporally separated from each other by an actual delay;
   (B) identifying an estimated delay between said luminance component and said chrominance component by correlating said luminance component in said intermediate signal to said chrominance component in said intermediate signal at a plurality of relative delays, wherein said estimated delay is determined using a plurality of correlation scores calculated between said luminance component and said chrominance component, each one of said correlation scores calculated at each respective one of said relative delays; and (C) compensating for said actual delay by delaying one of either (i) said luminance component and (ii) said chrominance component by said estimated delay; and (D) calculating a plurality of correlation scores between said luminance component and said chrominance component, one of said correlation scores at each respective one of said relative delays.

2. The method according to claim 1, wherein step (B) comprises the sub-step of:
  delaying a first component of either (i) said luminance component and (ii) said chrominance component by a first delay.

3. The method according to claim 2, wherein step (B) further comprises the sub-step of:
  delaying a second component of either (i) said luminance component and (ii) said chrominance component by a plurality of second delays such that said first delay is approximately half a total of said second delays.

4. The method according to claim 1, wherein step (B) further comprises the sub-step of:
  generating said estimated delay as one of said second delays corresponding to a highest score of said correlation scores.

5. The method according to claim 1, wherein step (B) further comprises the sub-step of:
  generating said estimated delay as a function of at least two of said correlation scores.

6. The method according to claim 1, wherein step (B) further comprises the sub-step of:
  generating said estimated delay as a default value in response to none of said correlation scores exceeding a threshold value.

7. The method according to claim 1, wherein step (B) further comprises the sub-steps of:
  calculating a plurality of intermediate scores by multiplying said luminance component with said chrominance component at each of said relative delays; and
  calculating a plurality of correlation scores by accumulating said intermediate scores from each of said multiplications.

8. The method according to claim 1, wherein (i) at least a first one of said relative delays causes said chrominance component to temporally lag behind said luminance component and (ii) at least a second one of said relative delays causes said luminance component to temporally lag behind said chrominance component.

9. An apparatus comprising:
  a conditioner generating an intermediate signal by processing a video signal such as to enhance a plurality of edges in a picture within said video signal, said picture having a luminance component and a chrominance component temporally separated from each other by an actual delay; and
  a correlator (i) identifying an estimated delay between said luminance component and said chrominance component by correlating said luminance component in said intermediate signal to said chrominance component in said intermediate signal at a plurality of relative delays and (ii) compensating for said actual delay by delaying one of either (a) said luminance component and (b) said chrominance component by said estimated delay, wherein said conditioner (i) high pass filters each of (a) said luminance component and (b) said chrominance component separately, (ii) differentiates adjoining samples in each of (a) said luminance component and (b) said chrominance component separately after said high pass filtering and (iii) low pass filters each of (a) said luminance component and (b) said chrominance component separately after said differentiating.

10. The apparatus according to claim 9, wherein said correlator comprises a delay module that delays a first component of either (i) said luminance component and (ii) said chrominance component by a first delay.

11. The apparatus according to claim 10, wherein said correlator further comprises a delay line that delays a second component of either (i) said luminance component and (ii) said chrominance component by a plurality of second delays such that said first delay is approximately half a total of said second delays.

12. The apparatus according to claim 9, wherein said correlator comprises a plurality of correlation fingers that calculate a plurality of correlation scores between said luminance component and said chrominance component, one of said correlation scores at each respective one of said relative delays.

13. The apparatus according to claim 12, wherein said correlator comprises a controller that calculates said estimated delay as one of said second delays corresponding to a highest score of said correlation scores.

14. The apparatus according to claim 12, wherein said correlator comprises a controller that calculates said estimated delay as a best fit curve using at least two of said correlation scores.

15. The apparatus according to claim 12, wherein said correlator comprises a controller that calculates said estimated delay as a default value in response to none of said correlation scores exceeding a threshold value.

16. The apparatus according to claim 9, wherein said correlator comprises a plurality of correlation fingers that (i) calculate a plurality of intermediate scores by multiplying said luminance component with said chrominance component at each of said relative delays and (ii) calculate a plurality of correlation scores by accumulating said intermediate scores from each of said multiplications.

17. A method of automatic luminance-chrominance delay compensation, comprising the steps of:
  (A) generating an intermediate signal by processing a video signal such as to enhance a plurality of edges in a picture within said video signal, said picture having a luminance component and a chrominance component temporally separated from each other by an actual delay;
  (B) identifying an estimated delay between said luminance component and said chrominance component by correlating said luminance component in said intermediate signal to said chrominance component in said intermediate signal at a plurality of relative delays;
  (C) compensating for said actual delay by delaying one of either (i) said luminance component and (ii) said chrominance component by said estimated delay, wherein step (A) comprises the sub-steps of (a) high pass filtering each of (i) said luminance component and (ii) said chrominance component separately, (b) differentiating adjoining samples in each of (i) said luminance component and (ii) said chrominance component separately after said high pass filtering and (c) low pass filtering each of (i) said luminance component and (ii) said chrominance component separately after said differentiating.

* * * * *